(12) United States Patent
Homan et al.

(10) Patent No.: US 6,317,485 B1
(45) Date of Patent: Nov. 13, 2001

(54) SYSTEM AND METHOD FOR INTEGRATING NOTIFICATION FUNCTIONS OF TWO MESSAGING SYSTEMS IN A UNIVERSAL MESSAGING SYSTEM

(75) Inventors: John L. Homan, Ephrata; Nicholas M. Luzeski, Paoli; Daniel P. Meyer, Downingtown, all of PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/094,026

(22) Filed: Jun. 9, 1998

(51) Int. Cl.[7] ................................................ H04M 1/64
(52) U.S. Cl. ............................ 379/88.12; 378/88.13; 378/88.21; 378/88.22
(58) Field of Search .................... 379/88.21, 88.17, 379/88.18, 88.12, 67.1, 88.14, 88.15, 88.16, 88.13, 88.22, 88.25, 88.26, 93.01, 69, 70

(56) References Cited

U.S. PATENT DOCUMENTS

| | | | |
|---|---|---|---|
| 4,476,349 | * 10/1984 | Cottrell et al. ........................ | 379/214 |
| 4,612,416 | * 9/1986 | Emerson et al. ................... | 379/88.18 |
| 4,646,346 | * 2/1987 | Emerson et al. ..................... | 379/214 |
| 4,837,798 | * 6/1989 | Cohen et al. ...................... | 379/88.14 |
| 5,133,004 | * 7/1992 | Heileman, Jr. et al. .......... | 379/88.26 |
| 5,138,710 | * 8/1992 | Kruesi et al. .......................... | 714/15 |
| 5,323,450 | * 6/1994 | Goldhagen et al. ............. | 379/100.01 |
| 5,333,266 | * 7/1994 | Boaz et al. ........................... | 709/206 |
| 5,384,829 | * 1/1995 | Heilman, Jr. et al. ............ | 379/88.26 |
| 5,493,606 | * 2/1996 | Osder et al. ...................... | 379/88.05 |
| 5,530,740 | * 6/1996 | Irribarren et al. ................ | 379/88.17 |
| 5,561,703 | * 10/1996 | Arledge et al. ..................... | 455/31.2 |
| 5,608,786 | * 3/1997 | Gordon ................................ | 370/352 |
| 5,633,916 | * 5/1997 | Goldhagen et al. .............. | 379/88.17 |
| 5,646,981 | * 7/1997 | Klein ................................. | 379/88.17 |
| 5,647,002 | * 7/1997 | Brunson ............................... | 709/206 |
| 5,661,781 | * 8/1997 | DeJager ........................... | 379/144.07 |
| 5,742,668 | * 4/1998 | Pepe et al. ........................... | 455/415 |
| 5,889,839 | * 3/1999 | Beyda et al. ...................... | 379/88.12 |
| 5,995,594 | * 11/1999 | Shaffer et al. .................... | 379/88.12 |
| 6,058,166 | * 10/1997 | Osder et al. ....................... | 379/88.22 |
| 6,233,317 | * 11/1997 | Homun et al. .................... | 379/88.05 |

* cited by examiner

Primary Examiner—Fan Tsang
Assistant Examiner—Ovidio Escalante
(74) Attorney, Agent, or Firm—Woodcock Washburn Kurtz Mackiewicz & Norris LLP; Mark T. Starr; Lise A. Rode

(57) ABSTRACT

A system and method for notifying subscribers to first and second communications networks that a message has been received at either the first communications network (such as a voice messaging system) or the second communications network (such as an e-mail messaging system). A subscriber receives notification at one point regardless of which communications network receives the new message. The subscriber can be notified by an outcall, a page, an e-mail, a lighted lamp, and/or a stutter dial tone.

16 Claims, 5 Drawing Sheets

SYSTEM AND METHOD FOR INTEGRATING NOTIFICATION FUNCTIONS OF TWO MESSAGING SYSTEMS IN A UNIVERSAL MESSAGING SYSTEM

FIELD OF THE INVENTION

The present invention relates in general to message notification systems used in connection with e-mail and voice/fax messaging systems. More particularly, the present invention relates to methods and apparatus for integrating the notification functions of e-mail and voice/fax messaging subsystems of a Universal Messaging system.

BACKGROUND OF THE INVENTION

It has become common practice within the past few years to arrange a communication system to receive voice messages when a called party is unavailable. The received message is recorded and an indicator, such as a lighted lamp, is given to the called party indicating the presence of a message that has been received.

Unisys Corporation, assignee of the present invention, provides a messaging system of the type that receives voice and/or fax messages and stores the messages for later retrieval by subscribers in the form of its Universal Voice Messaging System (UVMS), which is a network application that executes on the Unisys Network Applications Platform (the NAP system). The NAP system is a configuration of hardware and software that provides data and voice processing capabilities through applications, such as UVMS, running on a host computer. The NAP system provides the interface between these applications, called network applications, and a telephone network. Detailed descriptions concerning the construction and operation of messaging systems and of the NAP system and the means for developing network applications, such as UVMS, to run on the NAP system can be found in: U.S. Pat. No. 5,133,004, Jul. 21, 1992, "Digital Computer Platform for Supporting Telephone Network Applications"; U.S. Pat. No. 5,138,710, Aug. 11, 1992, "Apparatus and Method for Providing Recoverability in Mass Storage Data Base Systems Without Audit Trail Mechanisms"; U.S. Pat. No. 5,384,829, Jan. 24, 1995, "Digital Computer Platform for Supporting Telephone Network Applications"; U.S. Pat. No. 5,323,450, Jun. 21, 1994, "Telephone Network Applications Platform for Supporting Facsimile Applications"; U.S. Pat. No. 5,493,606, Feb. 20, 1996, "Multi-Lingual Prompt Management System for a Network Applications Platform"; U.S. Pat. No. 5,633, 916, May 27, 1997, "Universal Messaging Service Using Single Voice Grade Telephone Line Within a Client/Server Architecture"; U.S. Pat. application Ser. No. 08/944,924, filed Oct. 6, 1997, "Enhanced Multi-Lingual Prompt Management in a Voice Messaging System With Support for Speech Recognition"; U.S. patent application Ser. No. 08/964,744, filed Nov. 5, 1997, "Methods and Apparatus for Providing External Access to Executable Call Flows of a Network Application"; U.S. patent application Ser. No. 08/987,571, filed Dec. 11, 1997, "Multiple Language Electronic Mail Notification of Received Voice and/or Fax Messages"; U.S. patent application Ser. No. 09/094,126, filed on even date herewith, titled "Universal Messaging System Providing Integrated Voice, Data and Fax Messaging Services to PC/Web-based Clients, Including a Session Manager for Maintaining a Session Between a Messaging Platform and the Web-based Clients"; U.S. patent application Ser. No. 09/093,593, filed on even date herewith, titled "Universal Messaging System Providing Integrated Voice, Data and Fax Messaging Services to PC/Web-based Clients, Including a Content Manager for Receiving Information from Content Providers and Formatting the Same into Multimedia Containers for Distribution to Web-based Clients"; and U.S. patent application Ser. No. 09/094,266, filed on even date herewith, titled "Universal Messaging System Providing Integrated Voice, Data and Fax Messaging Services to PC/Web-based Clients, Including a Large Object Server for Efficiently Distributing Voice/Fax Messages to Web-based Clients". Each one of these patents and pending applications is hereby incorporated by reference in its entirety.

A network application, like UVMS, comprises one or more call flows that determine the functionality of the application. A call flow defines how a call is processed from the time it is connected until it is disconnected. It determines how the network application will react to various telephony-related events. In particular, a call flow specifies each function or processing step to be executed during a telephone call, the possible results for each function, the decision path to be followed based on the result, and each voice prompt to be played during the course of the telephone call. Certain call flows also interact with a subscriber to allow the subscriber to set certain user-defined parameters and to enable certain features of the network application.

UVMS is a voice/fax messaging system in which subscribers are each assigned a unique mailbox in which received voice and/or fax messages are stored for later retrieval and playback. A system administrator controls the system features that a subscriber is able to use through a mechanism known as a class of service (COS). COSs are sets of features assigned to different mailboxes. COSs are created and assigned to subscribers by the system administrator and enable the administrator to control the subscribers' use of UVMS features. One group of features that can be enabled in a given COS relate to the manner in which a subscriber can be informed of the receipt of a voice and/or fax message. For example, a message waiting indicator feature can be enabled to provide either a stutter dial tone or a flashing light on the subscriber's telephone to indicate that a voice message has been received and is ready for playback from a subscriber's mailbox.

As data terminals become popular, people have begun to communicate over the data network by sending e-mail messages to one another. These messages arrive at the recipient's host computer and are queued waiting for the recipient to request their presentation in display form on the screen of a terminal connected to the host computer. This arrangement presents problems in that terminals are not always available for use by a recipient. For example, if a data message were to be sent to an electronic address and the addressee were to be away at a location remote from his or her host computer, the received message would not be available to the addressee. Of equal concern, the addressee would not even know that a message has been delivered. The problems compound when users have several different e-mail services. Users must log on to each such service just to find out if messages are waiting.

As a consequence, a user of a plurality of messaging systems typically must individually monitor the status of all of them. The difficulty with existing voicemail service systems is that a user must query this system as well as all the other message service systems to locate and retrieve all messages.

Thus, it would be advantageous if the receiver could receive notification of new messages of different systems, whether he had access to all or to only one of the mail systems normally at his disposal. In other words, it would be advantageous to integrate the messaging systems efficiently, particularly voicemail and e-mail systems because of their relative prevalence, such that notification of all types of mail items is provided at one location or in one form.

Various schemes have been proposed for informing the users in a unified manner of the arrival of messages in any of a plurality of messaging systems. Illustrative examples of such schemes are described in U.S. Pat. No. 4,476,349, 4,612,416, 4,646,346, and 4,837,798.

The prior art typically has a message store for the voice/fax messages and a message store for the e-mail. Typically, both message stores duplicate storage or add dummy headers to track all the messages in all the stores. However, this requires additional storage space.

In a universal messaging system in which different messaging systems (e.g., voice/fax and e-mail) are integrated to provide the "universal" solution, there is a need to be able to handle notification of new messages, regardless of which system (voice/fax or e-mail) receives the message, while minimizing the amount of storage space that is used. The present invention provides a solution to this problem.

SUMMARY OF THE INVENTION

The present invention is directed to a method in a messaging environment comprising two messaging systems. The method comprises the steps of receiving one of a voice message, a fax message, and an e-mail message intended for a subscriber at either of the two messaging systems; checking a counter in the messaging system receiving the one message; and sending a notification to the subscriber, responsive to the counter, notifying the subscriber that the subscriber has received the one message, the notification having a form of at least one of an outcall, a page, an e-mail message, a lighted lamp, and stutter dial tone.

According to one aspect of the present invention, the method further comprises the step of incrementing the counter in the messaging system receiving the one message. The step of sending the notification comprises: accessing the counter in the messaging system receiving the one message and a second counter in the other of the two messaging systems to determine a number of newly received messages in each of the two messaging systems; accessing a database in one of the two messaging systems to determine the form of the notification; and sending the notification in the form responsive to the number of newly received messages in each of the two messaging systems.

In accordance with an aspect of the present invention, notification is sent if the counter in the messaging system receiving the one message equals one, and the second counter in the other of the two messaging systems equals zero.

In accordance with a further aspect of the present invention, notification is sent regardless of the number of newly received messages in each of the two messaging systems if the form of notification is at least one of an outcall and a page.

In accordance with a further aspect of the present invention, notification is sent if the form is at least one of an e-mail message, a lighted lamp, and a stutter dial tone, and if the counter in the messaging system receiving the one message equals one, and the second counter in the other of the two messaging systems equals zero.

In accordance with a further aspect of the present invention, the step of sending a notification comprises the steps of: determining the messaging system that received the one message and increasing a new message counter therein; determining the number of new messages the messaging system is storing; determining the number of new messages the other messaging system is storing; and sending the notification responsive to the number of new messages the messaging system is storing and the number of new messages the other messaging system is storing.

In accordance with a further aspect of the present invention, the method further comprises the steps of: checking a flag in the messaging system receiving the one message to determine if the subscriber has retrieved the one message; resetting the counter in the messaging system receiving the one message to zero when the subscriber has retrieved the one message; checking a counter in the other of the two messaging systems; and deactivating said notification when both counters equal zero.

In a further embodiment within the scope of the present invention, a messaging environment is provided that comprises: a first messaging system comprising means for receiving a message intended for a subscriber, the message comprising one of a voice message and a fax message; a second messaging system comprising means for receiving a message intended for the subscriber, the message comprising an e-mail message; and means for sending a notification to the subscriber via the first messaging system notifying the subscriber that the subscriber has received a message at one of the first messaging system and the second messaging system. The notification preferably has a form of at least one of an outcall, a page, an e-mail message, a lighted lamp, and a stutter dial tone.

According to further aspects of the invention, the first messaging system comprises a first counter for counting a number of newly received messages in the first messaging system; the second messaging system comprises a second counter for counting a number of newly received messages in the second messaging system; and the means for sending a notification comprises: means for accessing the first and second counters to determine a number of newly received messages in each of the first and second messaging systems; means for accessing a database in one of the two messaging systems to determine the form of the notification; and means for sending the notification in the form responsive to the number of newly received messages in each of the first and second messaging systems.

Another embodiment within the scope of this invention includes a voice and data messaging system, comprising: a first messaging system comprising means for receiving new voice and fax messages and storing the new voice and fax messages and counter means for counting a number of new voice and fax messages; a second messaging system comprising means for receiving and storing new e-mail messages and counter means for counting a number of new e-mail messages; an interface coupling the first messaging system and the second messaging system; and means for notifying a subscriber that at least one of a new voice message, a new fax message, and a new e-mail message has been received.

In another embodiment within the scope of this invention, in a messaging environment comprising a first system of a type capable of receiving at least one of a voice message and a fax message intended for a subscriber and a second system of a type capable of receiving an e-mail message intended for the subscriber, apparatus for notifying the subscriber via the first system that a message has been received at the second system, comprising: a database containing information that specifies the type of notification; a first counter containing a number of new messages in the first system; a second counter containing a number of new messages of the second system; program code embodied on a computer readable medium that contains instructions that when executed by a computer causes the computer to construct a notification message notifying the subscriber that the subscriber has received the message; and a service library that sends the notification message.

The foregoing and other aspects of the present invention will become apparent from the following detailed description of the invention when considered in conjunction with the accompanying drawings.

DESCRIPTION OF EXEMPLARY EMBODIMENTS AND BEST MODE

The present invention is directed to a system and method for notifying subscribers to first and second communications networks that a message has been received at either the first communications network (such as a voice messaging system) or the second communications network (such as an e-mail messaging system). A subscriber receives notification at one point regardless of which communications network receives the new message. An exemplary system and method is described in which subscribers to a universal voice messaging system (UVMS) which handles voice and fax messages are also subscribers to a message handling system (MHS) which handles e-mail messages. The methods and apparatus of the present invention may take the form of program code (i.e., instructions) embodied in tangible media, such as floppy diskettes, CD-ROMs, hard drives, tapes, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Figure 1A:
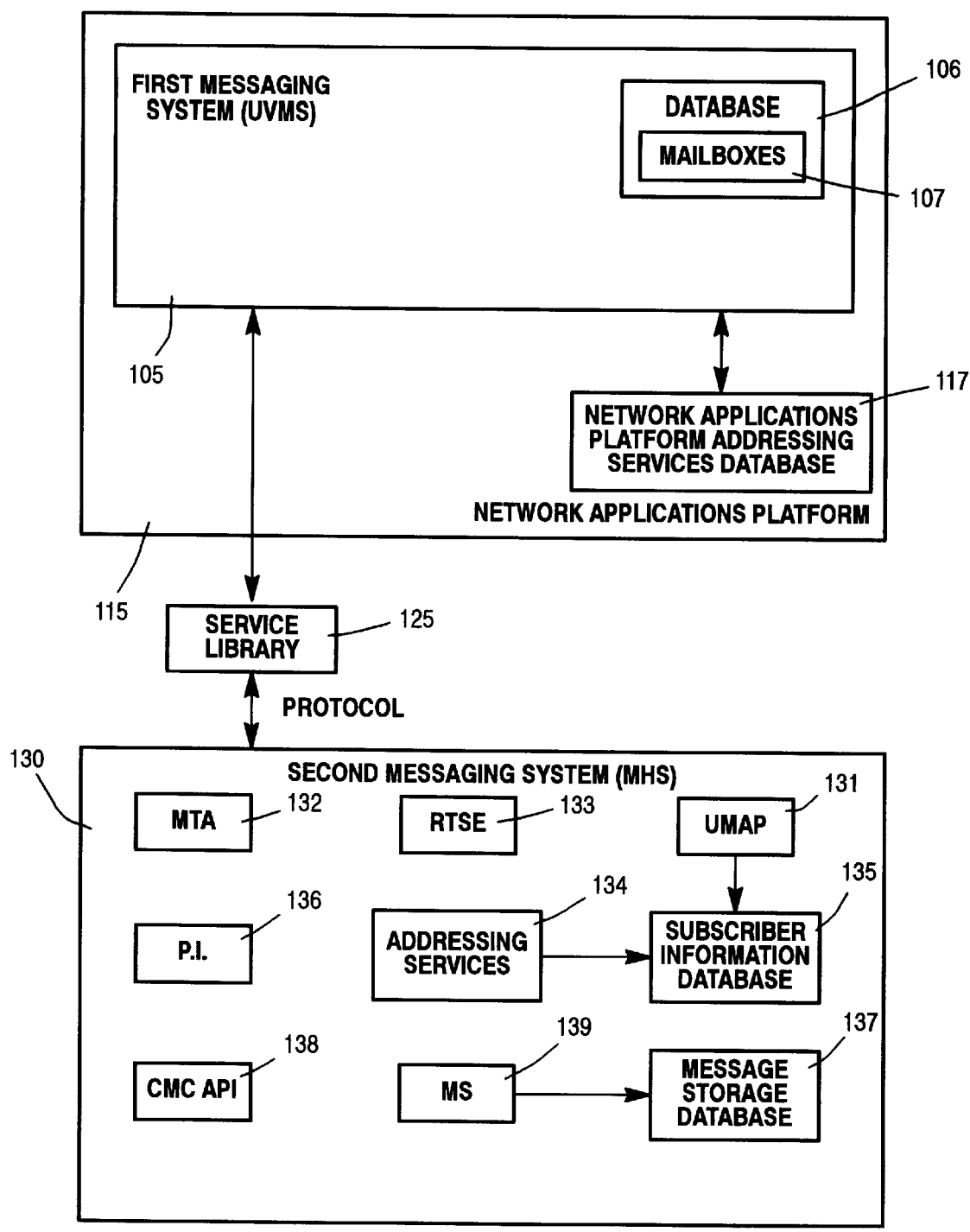
FIG. 1A shows a messaging system embodying methods and apparatus for notifying a subscriber of a received voice, fax, and/or e-mail message in accordance with the present invention.

FIG. 1A shows a preferred implementation of the system of the present invention. A first messaging system, such as a universal voice messaging system, or UVMS, 105 is a stand-alone application, contained within a network applications platform (NAP) 115, which preferably handles voicemail and faxmail, and comprises a database 106 which contains subscriber information. The NAP 115 receives and stores voice and/or fax messages for subscribers of the system via an interface to a telephone network (not shown). The NAP 115, as well as the first and second messaging systems and the service library of FIG. 1A, comprise a combination of hardware and software deployed on a host computer, such as a Unisys A Series or ClearPath™ HMP computer system. Although in the preferred embodiment the first messaging system is capable of receiving both voice and fax messages, the methods and apparatus of the present invention may also be used in systems that provide only voice messaging services, only fax messaging services, or other services in addition to voice and fax messaging services. The present invention is by no means limited to any one form of messaging system.

Each subscriber to the UVMS 105 has a mailbox 107 within the database 106 which stores that subscriber's voice and fax messages. The present invention preferably operates in an X.400 environment (an international standard for enabling disparate messaging systems to communicate with each other), but can be used with any protocol. The UVMS 105 is preferably accessible to subscribers at all times.

The UVMS features that can be used by a subscriber are determined by the class of service (COS) assigned to the subscriber's mailbox 107. A COS is an administratively created set of parameters for UVMS features that is assigned to each mailbox and defines the capabilities enabled for the mailbox. Preferably, screens are used to administer subscriber mailboxes and their COS options. Mailbox subscriber screens are used to enter subscriber information. Administrative screens allow for the complete setup of subscriber mailboxes prior to initialization. One option is how the subscriber is to be notified of a newly received message (a message that has not yet been opened). For example, a message waiting indicator (MWI) could be set, such as a lamp or a stutter dial tone, an e-mail message can be sent, an outgoing telephone call can be made, and/or a pager can be notified. A flag is used to set each of the notification options. If an outgoing telephone call is to be made, or a pager is to be notified, a dial out function is performed using a predetermined phone number to initiate the desired telephone call to the customer. A counter is provided to count the number of unopened or new messages that have been received and stored.

The NAP 115 also provides an addressing services library 117. The addressing services library 117 is a network-wide directory used to determine the location and existence of mailboxes within a network, such as a voicemail network. Preferably, subscribers are each identified in the addressing services library 117 by a mailbox number. The mailbox number of a subscriber can be used as an index into the addressing services library 117 to identify a COS for that subscriber.

According to the present invention, a UVMS system administrator enables the mail notification features of the present invention for a given subscriber by setting a predetermined mail notification variable equal to "Yes" as one of the features in the subscriber's specified COS. The subscriber can then turn the feature on and off using a personal options call flow in the UVMS 105.

Figure 2:
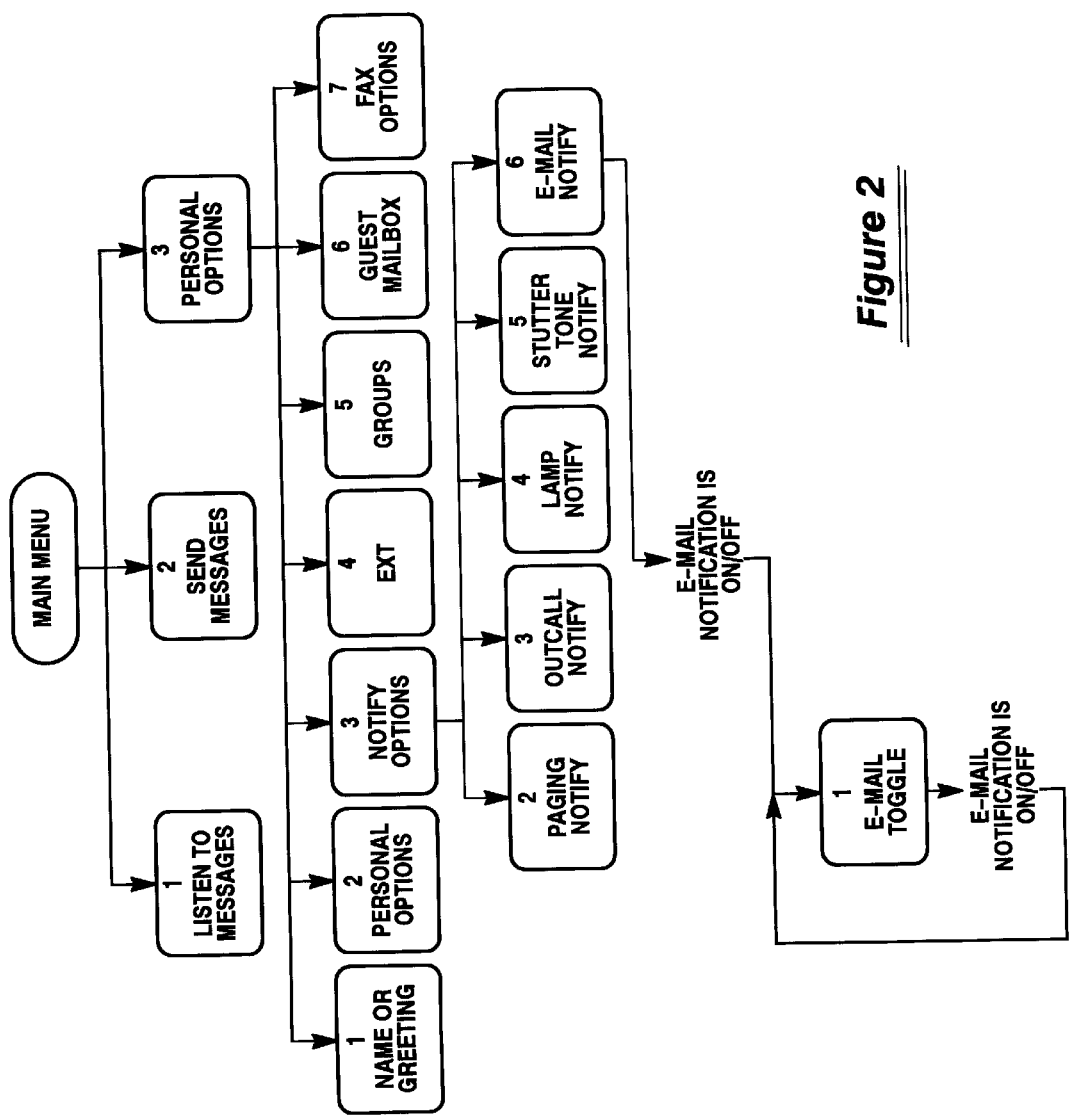
FIG. 2 is a call flow diagram illustrating the means by which a subscriber enables operation of the methods and apparatus of the present invention in the messaging system of FIG. 1A.

FIG. 2 illustrates an exemplary personal options call flow in accordance with the present invention that allows the subscriber to turn the notification feature of the present invention, as well as other features, on and off. As shown, when a subscriber first dials into the messaging system, the subscriber is presented with three choices, for example, the third being personal options. The subscriber selects the personal options menu by pressing "3" on the subscriber's telephone keypad. This presents sub-menu choices, as shown. For purposes of choosing notification, the subscriber selects the notify options sub-menu choice by again pressing the "3" on the keypad. This presents the subscriber with additional sub-menu choices corresponding to the available notify choices: paging notify, outcall notify, e-mail notify, lamp notify, and stutter tone notify. The desired notify choice is selected by pressing the appropriate number on the keypad. At this point, the subscriber will receive a voice prompt indicating the current state of the notification option, i.e., either "on" of "off". The subscriber can then press a number on the keypad to toggle the state of the option. Paging notify alerts a pager when a new message is received and is being held, and outcall notify calls a telephone number when a new message is received and is being held. E-mail notify sends an e-mail to a predetermined e-mail address when a new message is received and is being held. Lamp notify lights an indicator lamp on the telephone, and stutter tone notify changes the dial tone to a stutter tone, when a new message is received and is being held. Thus, the present invention provides for the active notification of a subscriber that a new message has been received. In a preferred embodiment, flags are used to enable the message notification feature of the MHS 130, as further described below.

Referring again to FIG. 1A, the database 106 provides information about each subscriber, including, for example, subscriber preferences for use of system features. Each subscriber has a respective entry in the database 106. When a subscriber turns on a feature using the personal options call flow, a flag in the database entry for that subscriber is set to "Yes". Further, according to the present invention, each subscriber entry in the database 106 contains one or more fields each of which specifies a telephone number and/or an e-mail address at which that subscriber can be notified of a newly received message. A notification message can be sent to each of the specified telephone numbers and/or e-mail addresses.

The preferred implementation of the present invention further comprises a second messaging system, such as a store and forward e-mail message handling system, or MHS, 130. The MHS 130 preferably comprises a universal messaging administration program (UMAP) 131, a message transfer agent (MTA) 132, a reliable transfer service element (RTSE) 133, addressing services 134, a message store provider (MS) 139, a protocol interpreter (P.I.) 136, a Common Messaging Calls (CMC) application programming interface (API) 138, a subscriber information database 135, and a message storage database 137. (Note that the CMC standard is defined by the X.400 API Association. CMC 1.0 defines a basic set of calls to inject and extract messages and files, and to access address information. CMC's major "competition" is MAPI—Messaging Application Programming Interface, though simple MAPI is almost identical to CMC.) In the preferred embodiment, e-mail subscriber information resides in the database 135 of the second messaging system, hereinafter referred to as the subscriber information database 135.

The message store provider 139, together with the message storage database 137, provides a repository for e-mail messages and maintains mail folders for each subscriber. The message store provider 139 also provides a means for submitting messages to local recipients or non-local recipients via a simple mail transport protocol (SMTP) and/or other protocol networks. The message store database 137 maintains a record index (or a counter) that allows the message store provider 139 to determine the existence of unopened or new messages that have been received and stored. The message store provider 139 notifies the UVMS 105 of the arrival of e-mail for a subscriber. The UVMS 105 then determines if a notification should occur, as described below with respect to FIG. 3.

Optionally, the message store provider 139 provides the subscriber with a mechanism to identify which types of messages should trigger notification. The subscriber can enter specific rules or criteria that a new message preferably satisfies before notification is sent that a new e-mail message has been received. This feature allows a subscriber to dynamically alter the notification criteria. The protocol interpreter 136 performs encoding and decoding services for the message store provider 139. In an exemplary embodiment, the message store provider 139 notifies the NAP 115 that a new e-mail message has arrived by checking the message type to determine if it is a candidate for notification. An index to the subscriber's folder in the message storage database 137 is provided to allow the message store provider 139 to determine if any messages qualify for notification. If a message does qualify for notification, and no other new messages are being stored, then the NAP 115 is notified of the new message.

In a preferred embodiment, for the message store provider 139 to notify the NAP 115 of a new e-mail message to ultimately alert the subscriber to a new e-mail message, a flag, such as an "e-mail enable MWI" flag, is set to "Yes" in the addressing database for the MHS 130. If the flag is set to "No", then the message storage provider 139 will not notify the NAP 115, and thus, the subscriber will not be alerted to the arrival of the new e-mail via the NAP 115 or the MWI.

The UMAP 131 is a graphical user interface tool that provides a means for the administrator to add, change, delete, and view an MHS configuration, addressing, and user data contained in the subscriber information database 135. The UMAP 131 runs within the second messaging system environment to preferably allow the administrator to create a "template" reflecting the SMTP domain name to be used to construct the subscriber's SMTP address, and the default name components to be used to construct the subscriber's name. The UMAP 131 preferably uses a universal messaging graphical user interface utility to create the server template. The data fields are filled in on this template in order to allow the creation of a profile, together with any other name component fields desired for the appropriate routing of incoming messages to the subscriber mailboxes. Also, the system administrator specifies a valid SMTP domain name for this template to allow the appropriate creation of SMTP addresses for UVMS subscribers. The name components and SMTP domain name in the server template desirably match the address conversion mapping values.

The message transfer agent 132 controls the routing of messages to applications on the local computer system or on other systems in the network. The RTSE 133 performs the system to system message transfers, either as the initiator (sender) or passive side (receiver) of the transfers. The addressing services element 134 controls access to the subscriber information database 135. A set of records, called a profile, is kept in the database 135 for each UVMS subscriber. The subscriber information can be added, changed, or deleted from the database 135. A detailed description of how subscriber information can be added, changed, or deleted can be found in co-pending, commonly assigned U.S. patent application Ser. No. 09/064,279, filed Apr. 22, 1998, "System and Method for Provisioning Subscribers in a Messaging Environment Comprising Two Messaging Systems". This pending application is hereby incorporated by reference in its entirety.

The CMC API 138 provides an industry standard (similar to MAPI) interface to the MHS 130. The UVMS 105 uses this CMC interface 138 to access e-mail messages in the MHS message storage database 137.

A service library 125 provides an interface between the NAP 115 and the MHS 130 and provides an interface for external functions into the repository of subscriber information. A detailed description of the service library 125 can be found in co-pending, commonly assigned U.S. patent application Ser. No. 08/964,744, filed Nov. 5, 1997, "Methods and Apparatus for Providing External Access to Executable Call Flows of a Network Application". This pending application is hereby incorporated by reference in its entirety. A protocol is followed in communications between the MHS 130 and the service library 125. The protocol defines the data that is being passed. The service library 125 provides an interface between one or more network applications and a client application to enable the client application to externally call and initiate execution of a selected function of one of the network applications. For example, the call flow can perform a dial out function to alert a customer of a newly received message.

Figure 1B:
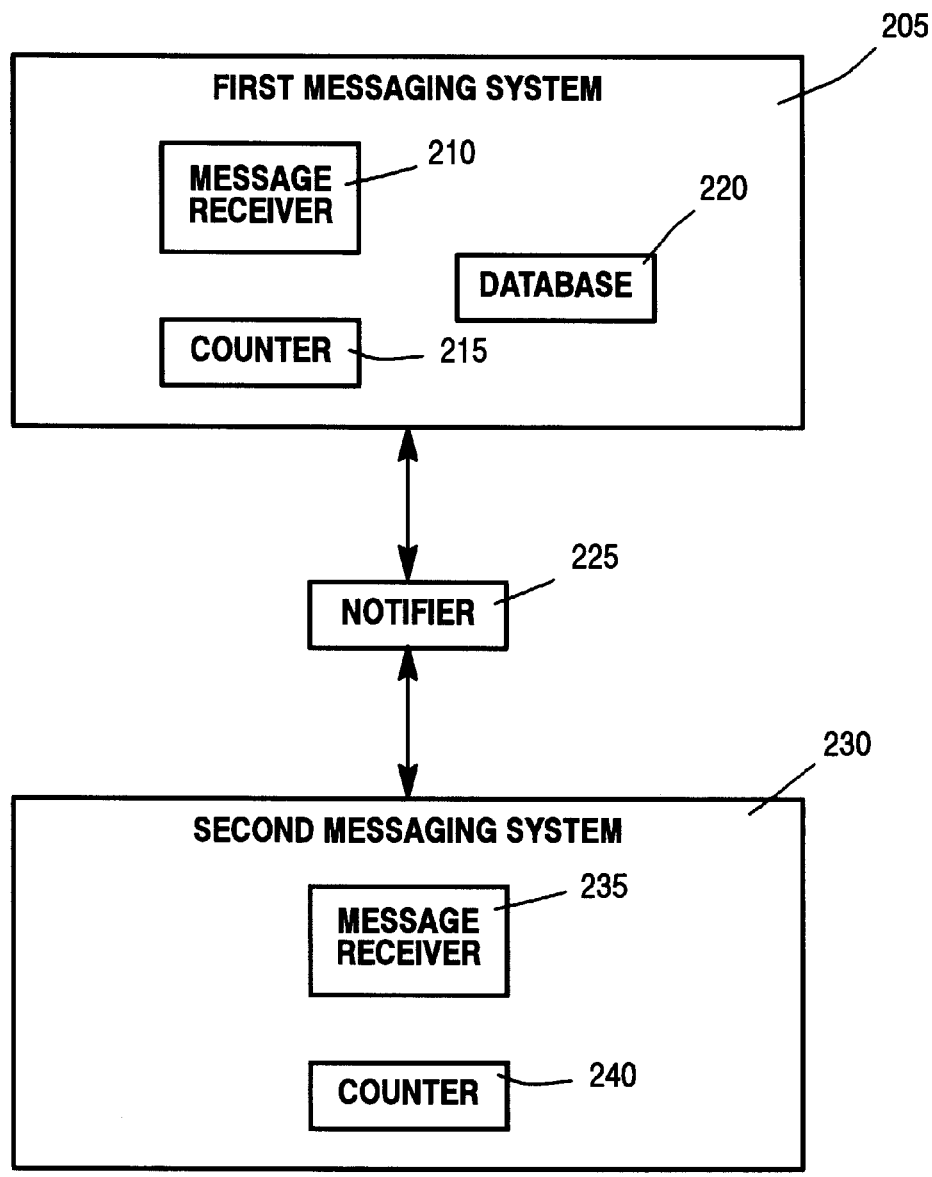
FIG. 1B shows another messaging system embodying methods and apparatus for notifying a subscriber of a received voice, fax, and/or e-mail message in accordance with the present invention.

FIG. 1B shows another messaging system embodying methods and apparatus for notifying a subscriber of a received voice, fax, and/or e-mail message in accordance with the present invention. A first messaging system 205, similar to the first messaging system 105 in FIG. 1A, comprises message receiver means 210 for receiving new messages, such as new voice and/or fax messages. A counter 215 is provided to maintain a count of the number of newly received messages. A database 220 contains the options as to how the subscriber is to be notified of a newly received message (a message that has not yet been opened). For example, a message waiting indicator (MWI) could be set, such as a lamp or a stutter dial tone, an e-mail message can be sent, an outgoing telephone call can be made, and/or a pager can be notified.

A second messaging system 230, similar to the second messaging system 130 in FIG. 1A, comprises message receiver means 235 for receiving new messages, such as new e-mail messages. A counter 240 is provided to maintain a count of the number of newly received messages. A notifier 225, similar to the service library 125, is provided as an interface between the first and second messaging systems. The notifier 225 sends a notification to the subscriber that a new message has been received, in accordance with FIGS. 3 and 4, described below.

Figure 3:
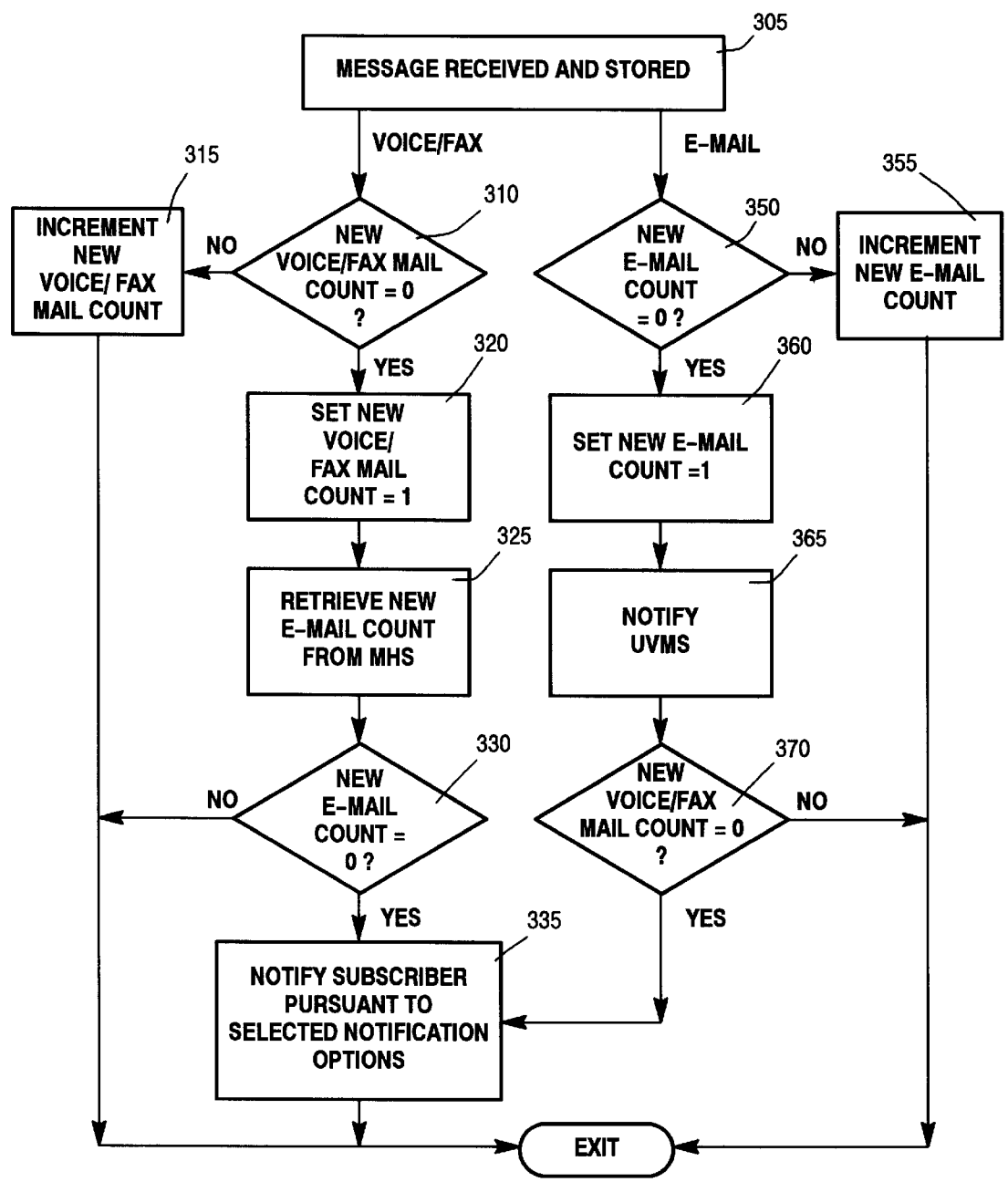
FIG. 3 is a flow diagram illustrating both the operation of the system of FIG. 1A and a preferred embodiment of a method of the present invention.

FIG. 3 shows an exemplary method in accordance with the present invention. A message is received and stored at step 305. If the message is received at the first messaging system (e.g., a voice or fax message), processing continues at step 310 with the checking of the new voice/fax mail count. If the new voice/fax mail count does not equal zero, then the notification should already be taking place. Therefore, the new voice/fax mail count is incremented at step 315, and the routine exits. If the new voice/fax mail count does equal zero, it is set equal to one at step 320, and the new message count is retrieved from the second messaging system (e.g., the new e-mail count) at step 325. The new e-mail count is checked at step 330. If the new e-mail count does not equal zero, then the notification should already be taking place, and the routine exits. If the new e-mail count does equal zero, then the notification options are checked for the subscriber at step 335, and the subscriber is notified of a new message in accordance with the notification options.

If the message is received at the second messaging system (e.g., an e-mail message), processing continues at step 350 with the checking of the presence of new or unread e-mail messages using the above described record index or counter. If the new e-mail count does not equal zero, then the notification should already be taking place. Therefore, the new e-mail count is incremented at step 355, and the routine exits. If the new e-mail count does equal zero, it is set equal to one at step 360, and the first messaging system (e.g., the UVMS) is notified at step 365. The UVMS checks the new voice/fax mail count at step 370. If the new voice/fax mail count does not equal zero, then the notification should already be taking place, and the routine exits. If the new voice/fax mail count does equal zero, then the notification options are checked for the subscriber at step 335, and the subscriber is notified of a new message in accordance with the notification options.

After the subscriber retrieves the new messages from the first messaging system (e.g., the UVMS), the count (e.g., the new voice/fax mail count) is reset to zero. After the subscriber retrieves the new messages from the second messaging system, the count (e.g., the new e-mail count) is reset to zero. Preferably, the UVMS checks the new mail count in both messaging systems, and when they are both equal to zero, the new message notification is deactivated (e.g., the MWI lamp is turned off). Therefore, if a subscriber has zero new voice/fax messages and one unread electronic message or e-mail message in the message store provider 139, and the subscriber then retrieves the message, the UVMS resets the notification for the subscriber mailbox (i.e., turns the notification off), and, in one exemplary embodiment, as new e-mail messages are retrieved/read, the message store provider 139 changes the message status in the subscriber's folder in the message store database 137 to 'read'.

In accordance with a further exemplary embodiment of the present invention, if one of the notification options is paging or outcall, the subscriber will be paged or telephoned each time a new message is received in any of the messaging systems that he subscribes to, regardless of the new mail count in the respective messaging systems. However, the notification through certain options (e.g., MWI lamp or stutter tone) remains unchanged with each subsequently received new message (i.e., the MWI lamp stays lit, and the stutter tone remains in effect).

According to one embodiment of the present invention, after the notification has taken place, the MWI is not set again until it has been deactivated (i.e., the subscriber has retrieved his messages) and a new message has been received. Moreover, with respect to an outcall or a page, each time a new message is received, an outcall or a page is performed. Preferably, however, an outcall or page is not performed for every new message that is being stored each time a new message is received. For example, if 10 new messages have come in and are being stored, and the subscriber has not responded to the outcall or page by retrieving his stored messages, and a new message (11) is received, only one outcall or page is performed, not 11. Preferably, when the subscriber picks up the outcall or page, he is presented with all the new messages, not just a specific message.

Figure 4:
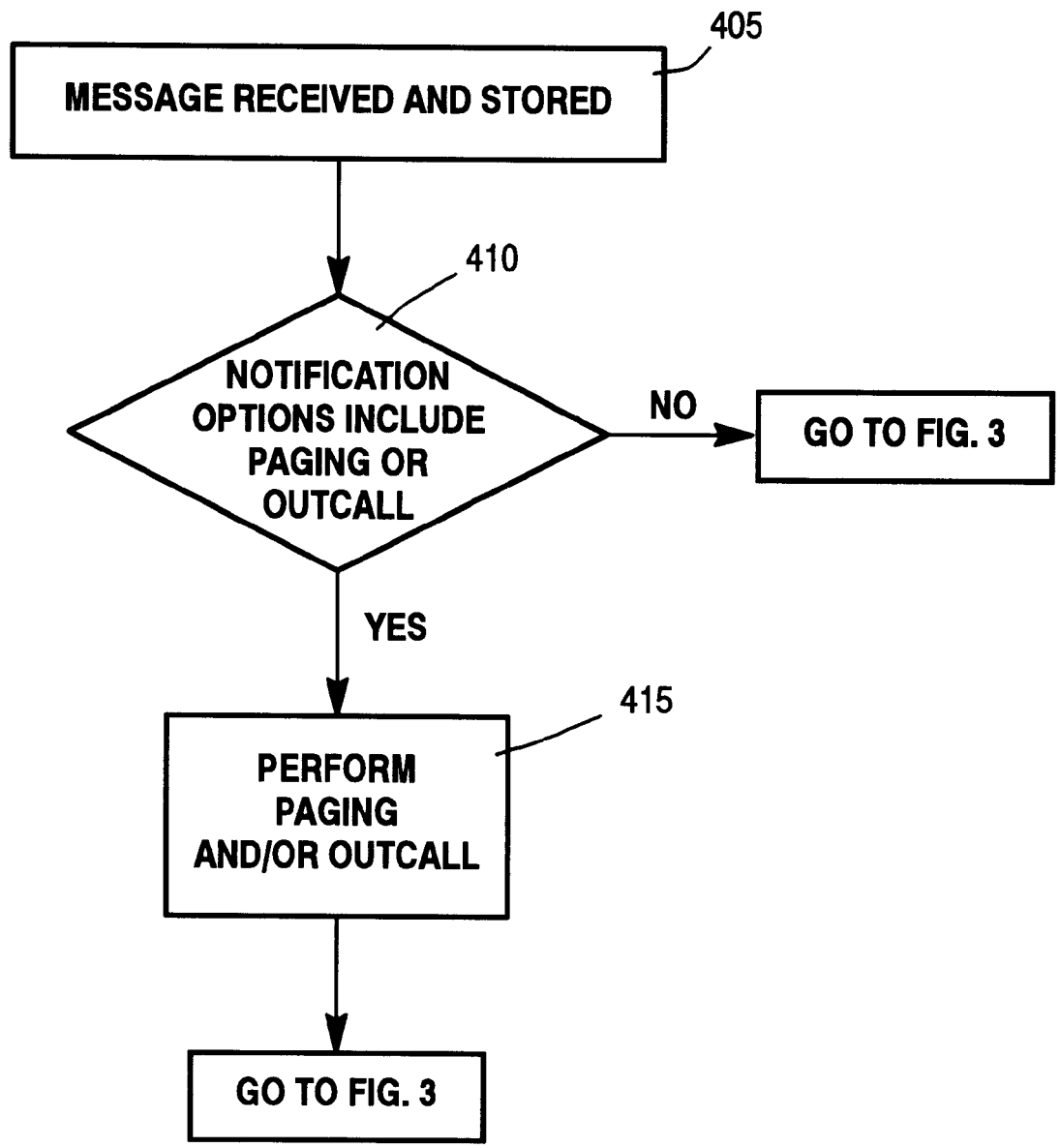
FIG. 4 is a flow diagram illustrating a further exemplary embodiment of a method in accordance with the present invention.

A flow diagram of an exemplary method in accordance with a further exemplary embodiment is shown in FIG. 4. A message is received and stored at step 405. The notification options are checked at step 410 for the subscriber to determine if options such as paging or outcall have been selected. If these options are not selected, then processing continues similar to that described above with respect to FIG. 3 at step 310 or step 350. If the paging or outcall notification options have been selected, then the paging and/or outcall is performed at step 415, and processing continues at FIG. 3 at step 310 or 350 to determine if the other notifications (e.g., MWI lamp or stutter tone) should be activated or if they have already been activated, and thus do not need to be reactivated.

Because a counter is used in the two messaging systems and each messaging system only stores its messages and not messages of the other messaging system, the present invention saves storage space. When a notification is potentially to take place, one messaging system queries the other to determine if a new message is being stored therein.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed:

1. In a messaging environment comprising a first message system and a second message system, a method comprising the steps of:

receiving one of a voice message, a fax message, and an e-mail message intended for a subscriber at either of the first and second messaging systems;

determining a number of stored new messages for said first messaging system;

determining a number of stored new messages for said second messaging system;

determining a form of notification; and sending a notification in said form to the subscriber notifying the subscriber that the subscriber has received said one message only if said form is at least one of an e-mail message, a lighted lamp, and a stutter dial tone, and only if said messaging systems is storing only one of said first and second said received message and only if the other of said first and second messaging systems is not storing any new messages.

2. The method recited in claim 1, further comprising the step of incrementing a counter in the one of said first and second messaging systems receiving said one message, wherein said steps of determining a number of new messages said one of said first and second messaging systems is storing and a number of new messages said other of said first and second messaging systems is storing comprises:

accessing said counter in the one of said first and second messaging systems receiving said one message and a second counter in the other of the first and second messaging systems to determine a number of newly received messages in each of the first and second messaging systems.

3. The method recited in claim 2, wherein said step of sending said notification in said form includes sending said notification if said counter in the one of said first and second messaging systems receiving said one message equals one, and said second counter in the other of the first and second messaging systems equals zero.

4. The method recited in claim 2, wherein said step of sending said notification in said form includes sending said notification regardless of the number of newly received messages in each of the first and second messaging systems if said form of notification is at least one of an outcall and a page.

5. The method recited in claim 4, wherein said step of sending said notification in said form includes sending said notification if said form is at least one of an e-mail message, a lighted lamp, and a stutter dial tone, and if said counter in the one of said first and second messaging systems receiving said one message equals one, and said second counter in the other of the first and second messaging systems equals zero.

6. The method recited in claim 1, wherein said step of determining said form of notification comprises accessing a database in one of the first and second messaging systems to determine said form of notification.

7. The method recited in claim 1, further comprising the steps of:

checking a flag in the one of said first and second messaging systems receiving said one message to determine if said subscriber has retrieved said one message;

resetting said counter in the one of said first and second messaging systems receiving said one message to zero when said subscriber has retrieved said one message;

checking a counter in the other of the first and second messaging systems; and deactivating said notification when both said counters equal zero.

8. A messaging environment comprising:

a first messaging system comprising a first message receiver for receiving a message intended for a subscriber, said message comprising one of a voice message and a fax message;

a second messaging system comprising a second message receiver for receiving a message intended for said subscriber, said message comprising an e-mail message; and a notification system for sending a notification in a form to said subscriber notifying said subscriber that said subscriber has received a message at one of said first messaging system and said second messaging system only if said form is at least one of an e-mail message, a lighted lamp, and a stutter dial tone, and only if said messaging system that has received said message is storing only said received message and only if said other messaging system is not storing any new messages.

9. The messaging environment recited in claim 8, wherein said first messaging system comprises a first counter for counting a number of newly received messages in said first messaging system;

said second messaging system comprises a second counter for counting a number of newly received messages in said second messaging system; and said notification system comprises:

means for accessing said first and second counters to determine a number of newly received messages in each of said first and second messaging systems; and means for accessing a database in one of said two messaging systems to determine said form of said notification.

10. The messaging environment recited in claim 9, further comprising:

means for sending said notification if said counter in said messaging system receiving said message equals one, and said counter in the other messaging system equals zero.

11. The messaging environment recited in claim 9, further comprising means for sending said notification regardless of the number of newly received messages in each of the two messaging systems if said form of notification is at least one of an outcall and a page.

12. A voice and data messaging system, comprising:
- a first messaging system comprising a first message receiver for receiving new voice and fax messages and storing said new voice and fax messages and a first counter for counting a number of new voice and fax messages;
- a second messaging system comprising a second message receiver for receiving and storing new e-mail messages and a second counter for counting a number of new e-mail messages;
- an interface coupling said first messaging system and said second messaging system; and
- an indicator for notifying a subscriber that at least one of a new voice message, a new fax message, and a new e-mail message has been received only if said indicator is at least one of an e-mail message, a lighted lamp, and a stutter dial tone, and only if one of said counters equals one, and only if the other of said counters equals zero.

13. The voice and data messaging system recited in claim 12, further comprising means for checking said counters in said first and second messaging systems and providing the number of new voice and fax messages and the number of new e-mail messages to said indicator for notifying the subscriber.

14. The voice and data messaging system recited in claim 13, further comprising:
- means for activating said indicator for notifying the subscriber regardless of the number of newly received messages in each of the two messaging systems if said indicator for notifying the subscriber is at least one of an outcall and a page.

15. The voice and data messaging system recited in claim 12, wherein said indicator for notifying the subscriber comprises at least one of an outcall, a page, an e-mail message, a lighted lamp, and a stutter dial tone.

16. In a messaging environment comprising a first system of a type capable of receiving at least one of a voice message and a fax message intended for a subscriber and a second system of a type capable of receiving an e-mail message intended for the subscriber, apparatus for notifying the subscriber via the first system that a message has been received at the second system, comprising:
- a database containing information that specifies the type of notification, the type of notification comprising at least one of an outcall, a page, an e-mail message, a lighted lamp, and a stutter dial tone;
- a first counter containing a number of new messages in said first system;
- a second counter containing a number of new messages of said second system;
- program code embodied on a computer readable medium that contains instructions that when executed by a computer causes the computer to construct a notification message notifying the subscriber that the subscriber has received said message; and
- a service library that sends the notification message regardless of the number of new messages that are being stored in said two messaging systems if said form of notification is a page or an outcall, and sending said notification message if said form is at least one of an e-mail message, a lighted lamp, and a stutter dial tone, and only if one of said counters equals one, and only if the other of said counters equals zero.

* * * * *